United States Patent
Nelson et al.

(10) Patent No.: US 9,061,370 B2
(45) Date of Patent: Jun. 23, 2015

(54) FRICTION STIR WELDING USING A SUPERABRASIVE TOOL

(71) Applicants: Megastir Technologies LLC, Provo, UT (US); Brigham Young University, Provo, UT (US)

(72) Inventors: Tracy W. Nelson, Provo, UT (US); Carl D. Sorenson, Provo, UT (US); Scott M. Packer, Alpine, UT (US); Paul Allen Felter, Layton, UT (US)

(73) Assignees: BRIGHAM YOUNG UNIVERSITY, Provo, UT (US); MEGASTIR TECHNOLOGIES LLC, Provo, UT (US)

( * ) Notice: Subject to any disclaimer, the term of this patent is extended or adjusted under 35 U.S.C. 154(b) by 0 days.

(21) Appl. No.: 14/052,582

(22) Filed: Oct. 11, 2013

(65) Prior Publication Data

US 2014/0034710 A1 Feb. 6, 2014

Related U.S. Application Data

(60) Division of application No. 13/669,219, filed on Nov. 5, 2012, now abandoned, which is a continuation of application No. 13/206,393, filed on Aug. 9, 2011, now Pat. No. 8,302,834, which is a continuation of (Continued)

(51) Int. Cl.
*B23K 20/12* (2006.01)
*B23K 20/227* (2006.01)

(52) U.S. Cl.
CPC ........... *B23K 20/122* (2013.01); *B23K 20/1255* (2013.01); *B23K 20/129* (2013.01); *B23K 20/227* (2013.01); *B23K 2203/04* (2013.01); *B23K 2203/10* (2013.01); *B23K 2203/16* (2013.01)

(58) Field of Classification Search
CPC ........... B23K 20/1255; B23K 20/1215; B23K 20/122; B23K 20/1265; B23K 20/129; B23K 20/227; B23K 2201/18; B23K 2203/04; B23K 2203/10; B23K 2203/16; B23K 20/1275
USPC ............................... 228/112.1, 113, 114, 2.1
See application file for complete search history.

(56) References Cited

U.S. PATENT DOCUMENTS

| 2,299,207 | A | 10/1942 | Bevillard |
| 4,144,110 | A | 3/1979 | Luc |
| 5,116,568 | A | 5/1992 | Sung et al. |

(Continued)

FOREIGN PATENT DOCUMENTS

| EP | 0 797 043 A2 | 9/1997 |
| EP | 0 810 054 A1 | 12/1997 |

(Continued)

*Primary Examiner* — Erin Saad
(74) *Attorney, Agent, or Firm* — Workman Nydegger

(57) ABSTRACT

A probe for friction stir welding MMCs, ferrous alloys, non-ferrous alloys, and superalloys, as well as non-ferrous alloys, the probe including a shank, a shoulder, and a pin disposed through the shoulder and into the shank, wherein the pin and the shoulder at least include a coating comprised of a superabrasive material, the pin and shoulder being designed to reduce stress risers, disposing a collar around a portion of the shoulder and the shank to thereby prevent movement of the shoulder relative to the shank, and incorporating thermal management by providing a thermal flow barrier between the shoulder and the shank, and between the collar and the tool.

19 Claims, 9 Drawing Sheets

Related U.S. Application Data application No. 12/658,919, filed on Feb. 16, 2010, now Pat. No. 7,993,575, which is a continuation of application No. 11/637,606, filed on Dec. 12, 2006, now Pat. No. 7,661,572, which is a continuation of application No. 10/705,717, filed on Nov. 10, 2003, now Pat. No. 7,152,776, which is a continuation of application No. 09/851,596, filed on May 8, 2001, now Pat. No. 6,648,206.

(60) Provisional application No. 60/202,665, filed on May 8, 2000.

(56) References Cited

U.S. PATENT DOCUMENTS

| | | | |
|---|---|---|---|
| 5,213,248 A | 5/1993 | Horton | |
| 5,611,479 A | 3/1997 | Rosen | |
| 5,697,511 A | 12/1997 | Bampton | |
| 5,713,507 A | 2/1998 | Holt et al. | |
| 5,718,366 A | 2/1998 | Colligan | |
| 5,758,999 A | 6/1998 | Geise | |
| 5,769,306 A | 6/1998 | Colligan | |
| 5,794,835 A | 8/1998 | Colligan et al. | |
| 5,811,755 A | 9/1998 | McGee | |
| 5,813,592 A | 9/1998 | Midling et al. | |
| 5,829,664 A | 11/1998 | Spinella et al. | |
| 5,893,507 A | 4/1999 | Ding et al. | |
| 5,971,247 A | 10/1999 | Gentry | |
| 5,971,252 A | 10/1999 | Rosen et al. | |
| 5,975,406 A | 11/1999 | Mahoney et al. | |
| 6,045,027 A | 4/2000 | Rosen et al. | |
| 6,045,028 A | 4/2000 | Martin et al. | |
| 6,050,474 A | 4/2000 | Aota et al. | |
| 6,050,475 A | 4/2000 | Kinton et al. | |
| 6,051,325 A | 4/2000 | Talwar et al. | |
| 6,053,391 A | 4/2000 | Heideman et al. | |
| 6,057,513 A | 5/2000 | Ushikoshi et al. | |
| 6,070,784 A | 6/2000 | Holt et al. | |
| 6,138,895 A | 10/2000 | Oelgoetz et al. | |
| 6,168,066 B1 | 1/2001 | Arbegast | |
| 6,168,067 B1 | 1/2001 | Waldron et al. | |
| 6,173,880 B1 | 1/2001 | Ding et al. | |
| 6,193,137 B1 | 2/2001 | Ezumi et al. | |
| 6,543,671 B2 | 4/2003 | Hatten et al. | |
| 6,648,206 B2 | 11/2003 | Nelson et al. | |
| 2002/0011509 A1 | 1/2002 | Nelson et al. | |
| 2002/0014516 A1 | 2/2002 | Nelson et al. | |
| 2003/0116608 A1 | 6/2003 | Litwinski | |
| 2004/0118899 A1* | 6/2004 | Aota et al. | 228/112.1 |
| 2004/0134972 A1 | 7/2004 | Nelson et al. | |
| 2004/0155093 A1 | 8/2004 | Nelson et al. | |
| 2005/0249978 A1 | 11/2005 | Yao | |
| 2006/0043152 A1 | 3/2006 | Stol et al. | |
| 2006/0157531 A1 | 7/2006 | Packer et al. | |
| 2006/0169740 A1 | 8/2006 | Fukuhara et al. | |
| 2007/0102492 A1 | 5/2007 | Nelson et al. | |
| 2008/0251571 A1 | 10/2008 | Burford | |
| 2010/0146866 A1* | 6/2010 | Nelson et al. | 51/307 |

FOREIGN PATENT DOCUMENTS

| | | |
|---|---|---|
| EP | 0 833 097 A2 | 4/1998 |
| EP | 0 867 254 A1 | 9/1998 |
| EP | 0 810 055 B1 | 12/1998 |
| EP | 0 810 056 A3 | 12/1998 |
| EP | 0 888 843 A1 | 1/1999 |
| EP | 0 893 189 A2 | 1/1999 |
| EP | 0 893 190 A2 | 1/1999 |
| EP | 0 925 964 A2 | 6/1999 |
| EP | 0 928 659 A1 | 7/1999 |
| EP | 0 947 280 A1 | 10/1999 |
| EP | 0 968 788 A2 | 1/2000 |
| EP | 0 972 605 A2 | 1/2000 |
| EP | 0 985 483 A2 | 3/2000 |
| EP | 0 992 314 A2 | 4/2000 |
| EP | 1 029 627 A1 | 8/2000 |
| EP | 1 046 453 A2 | 10/2000 |
| EP | 1 048 390 A2 | 11/2000 |
| EP | 1 055 478 A1 | 11/2000 |
| EP | 1 057 572 A2 | 12/2000 |
| EP | 1 057 573 A2 | 12/2000 |
| EP | 1 057 574 A2 | 12/2000 |
| EP | 1 057 575 A2 | 12/2000 |
| EP | 1 057 576 A2 | 12/2000 |
| GB | 2 306 366 A | 5/1997 |
| WO | WO 93/10935 | 6/1993 |
| WO | WO 97/15462 | 5/1997 |
| WO | WO 97/48517 | 12/1997 |
| WO | WO 98/13167 | 4/1998 |
| WO | WO 98/45080 | 10/1998 |
| WO | WO 98/51441 | 11/1998 |
| WO | WO 98/58759 | 12/1998 |
| WO | WO 99/32254 | 7/1999 |
| WO | WO 99/32255 | 7/1999 |
| WO | WO 99/33594 | 7/1999 |
| WO | WO 99/34951 | 7/1999 |
| WO | WO 99/39861 | 8/1999 |
| WO | WO 99/52669 | 10/1999 |
| WO | WO 99/54081 | 10/1999 |
| WO | WO 99/58288 | 11/1999 |
| WO | WO 99/65637 | 12/1999 |
| WO | WO 00/02698 | 1/2000 |
| WO | WO 00/02699 | 1/2000 |
| WO | WO 00/02704 | 1/2000 |
| WO | WO 00/03818 | 1/2000 |
| WO | WO 00/56497 | 9/2000 |

* cited by examiner

FRICTION STIR WELDING USING A SUPERABRASIVE TOOL

BACKGROUND

1. The Field of the Invention

This invention relates generally to friction stir welding wherein heat for creating a weld is generated by plunging a rotating pin of a tool into a workpiece. More specifically, the present invention relates to a new tool that is used in a friction stir welding process that enables the present invention to weld materials that are not functionally weldable using state of the art friction stir welding processes and tools, said materials including ferrous alloys such as stainless steel, and higher melting point super alloys that contain only small amounts of or no ferrous materials at all.

2. Background of the Invention

Friction welding has been used in industry for years. It is a solid-state process that yields large economic benefits because it avoids many problems associated with rapid solidification of molten material that occurs in traditional fusion welding processes.

One example of friction welding occurs when the ends of two pipes are pressed together while one pipe is rigidly held in place, and the other is pressed against it and turned. As heat is generated by friction, the ends of the pipes become plasticized. By quickly stopping rotation of the pipes, the two pipes fuse together. Note that in this case, the frictional heating is caused by the relative motion of the two parts to be joined.

In contrast, FIG. 1 is a perspective view of a tool being used for friction stir butt welding that is characterized by a generally cylindrical tool 10 having a shoulder 12 and a pin 14 extending outward from the shoulder. The pin 14 is rotated against a workpiece 16 until sufficient heat is generated, wherein the pin of the tool is plunged into the plasticized workpiece material. The workpiece 16 is often two sheets or plates of material that are butted together at a joint line 18. The pin 14 is plunged into the workpiece 16 at the joint line 18. The frictional heat caused by rotational motion of the pin 14 against the workpiece material 16 causes the workpiece material to soften without reaching a melting point. The tool 10 is moved transversely along the joint line 18, thereby creating a weld as the plasticized material flows around the pin from a leading edge to a trailing edge. The result is a solid phase bond 20 at the joint line 18 that is generally indistinguishable from the workpiece material 16.

The prior art is replete with friction stir welding patents that teach the benefits of using the technique to obtain welds that have beneficial characteristics over contemporary fusion welding processes. These benefits include low distortion in long welds, no fumes, no porosity, no splatter, and excellent mechanical properties regarding tensile strength. Furthermore, the process has the advantage of using a non-consumable tool, no need for filler wire, no need for gas shielding, and a tolerance for imperfect weld preparations such as the presence of oxide in the weld region. The process is especially useful for preventing significant heat damage or otherwise altering the properties of the original material being welded.

However, it has long been a desire of industry to be able to weld materials that are presently functionally unweldable for friction stir welding. Thus, while friction stir welding is a very advantageous technique for welding non-ferrous alloys such as aluminum, brass and bronze, there has been no tool that is capable of functionally welding materials having higher melting points. It should be understood that functionally weldable materials are those that are weldable using friction stir welding in more than nominal lengths, and without destroying the tool.

Unfortunately, fusion welding alters or damages the alloy at the weld, thereby compromising the weld as a result of the defects or adverse phases which form in the weld during the welding process. In some cases, the non-metallic reinforcement material which has been joined with the original workpiece material to create the alloy is depleted at the weld. The result is a weld that has properties and characteristics which are different from the unaltered areas of the original workpiece material.

Until now, it has been the nature of friction stir welding that using a conventional friction stir welding tool or probe is worn down significantly so as to prevent functional welding of materials such as MMCs, ferrous alloys, and superalloys. Most tools simply do not work at all in MMCs, ferrous alloys, and superalloys. If a conventional tool could begin friction stir welding, the wear would be so significant that a probe would be torn apart after only a short distance. For example, some alloys will cause wear on a probe such that it can no longer function after welding for a distance of only inches.

Unfortunately, it is generally the case that it is not possible to simply insert a new tool and begin the friction stir welding process where the previous probe failed. If the weld is not continuous and uninterrupted, it is useless because of mechanical weakness. Furthermore, a portion of the tool is typically left behind in the workpiece material, also contributing to the mechanical weakness.

Therefore, it would be an advantage over the prior art to provide a new tool for use with the friction stir welding process that enables longer continuous and uninterrupted welding runs (functional welding) of materials that will cause a conventional tool to fail after a short distance. It would also be an advantage over the prior art if the new tool made it possible to friction stir weld materials that were previously too difficult to weld with conventional friction stir welding tools. It would also be an advantage to provide a tool that would enable friction stir welding with conventional workpiece materials, while exhibiting improved wear characteristics for the tool.

A first class of materials that would be desirable to friction stir weld but are functionally unweldable with conventional tools are known as metal matrix composites (MMCs). An MMC is a material having a metal phase and a ceramic phase. Examples of the ceramic phase include silicon carbide and boron carbide. A common metal used in MMCs is aluminum.

MMCs have desirable stiffness and wear characteristics, but they also have a low fracture toughness, thereby limiting applications. A good example of a use for MMCs is in disk brake rotors on vehicles, where stiffness, strength and wear provide advantages over present materials, and where the more brittle nature is generally not an issue. The MMC makes the rotor lighter than cast-iron, and the ceramic phase such as silicon carbide enables greater wear resistance.

Other important applications for MMCs include, but should no be considered limited to, drive shafts, cylinder liners, engine connecting rods, aircraft landing gear, aircraft engine components, bicycle frames, golf clubs, radiation shielding components, satellites, and aeronautical structures.

A second class of materials that would be desirable to friction stir weld, and which have much broader industrial applications, are ferrous alloys. Ferrous alloys include steel and stainless steel. Possible applications are far-ranging, and include the shipbuilding, aerospace, railway, construction and transportation industries. The stainless steel market alone is at least five times greater than the market for aluminum alloys. It has been determined that steels and stainless steels represent more than 80% of welded products, making the ability to friction stir weld highly desirable.

Finally, a third class of materials that would be desirable to friction stir weld, have broad industrial applications, have a higher melting point than ferrous alloys, and either have a small amount of iron or none, are the super alloys. Superalloys are nickel-, iron-nickel, and cobalt-base alloys generally used at temperatures above 1000 degrees F. Additional elements commonly found in superalloys include, but are not limited to, chromium, molybdenum, tungsten, aluminum, titanium, niobium, tantalum, and rhenium.

It is noted that titanium is also a desirable material to friction stir weld. Titanium is a non-ferrous material, but has a higher melting point than other non-ferrous materials.

There are significant challenges that have so far prevented the creation of a tool that can functionally weld MMCs, ferrous alloys, and superalloys. Some of these challenges only became apparent during experimentation as the inventors initially attempted to modify existing tools that can friction stir weld non-ferrous alloys. These challenges and the evolution of the tool will be discussed so as to enable the reader to practice the invention.

SUMMARY OF INVENTION

It is an object of the present invention to provide a new tool for use in friction stir welding that has improved wear characteristics over conventional tools.

It is another object to provide the new tool that includes a superabrasive material that enables friction stir welding of MMCs, ferrous alloys, and superalloys, as well as non-ferrous alloys.

It is another object to provide the new tool that enables improved weld characteristics for the non-ferrous alloys.

It is another object to provide the new tool that enables finishing costs of a welded material to be reduced.

It is another object to provide the new tool that has an improved geometry to reduce wear of the tool when friction stir welding MMCs, ferrous alloys and superalloys.

It is another object to reduce thermal, mechanical and chemical wear of the new tool.

It is another object to provide thermal management for the new tool.

In a preferred embodiment, the present invention is a tool for friction stir welding MMCs, ferrous alloys, non-ferrous alloys, and superalloys, the tool including a shank, a shoulder, and a pin disposed through the shoulder and into the shank, wherein the pin and the shoulder at least include a coating comprised of a superabrasive material, the pin and shoulder being designed to reduce stress risers, disposing a collar around a portion of the shoulder and the shank to thereby inhibit rotational movement of the shoulder relative to the shank, and incorporating thermal management by providing a thermal flow barrier between the shoulder and the shank, and between the collar and the tool.

In a first aspect of the invention, the shank, shoulder, and pin are separate components that are coupled together to form the friction stir welding tool, wherein the shoulder and the shank include a superabrasive coating.

In a second aspect of the invention, the shank and the shoulder are a monolithic element including a superabrasive coating over at least a portion thereof, and having a separate pin with a superabrasive coating.

In a third aspect of the invention, the shank, shoulder and pin are a monolithic element having a superabrasive coating covering at least a portion thereof.

In a fourth aspect of the invention, thermal management of heat using thermal flow barriers within the tool enables sufficient heat to be generated at the pin to enable friction stir welding, while protecting a tool holder from heat damage.

In a fifth aspect of the invention, stress risers are reduced on the pin, larger radii are provided on the shoulder, and pin diameter is increased to thereby enable friction stir welding of MMCs, ferrous alloys, and superalloys.

In a sixth aspect of the invention, the tool includes at least one CVD, ion-beam implanted, and/or PVD coating disposed over the superabrasive coating to thereby increase resistance to chemical and mechanical wear.

In a seventh aspect of the invention, the tool is coated with a whisker reinforced superabrasive in order to decrease spalling of the superabrasive coating.

In an eighth aspect of the invention, flats are disposed along the lengthwise axis of the tool to thereby prevent separation of the tool into component elements during translational motion of the tool.

In a ninth aspect of the invention, the superabrasive coating is selected based upon a desired balance between chemical wear and mechanical wear.

In a tenth aspect of the invention, the superabrasive coating is selected based upon the characteristic of having a low coefficient of friction that prevents the workpiece material from adhering to the tool, thereby reducing wear of the tool.

These and other objects, features, advantages and alternative aspects of the present invention will become apparent to those skilled in the art from a consideration of the following detailed description taken in combination with the accompanying drawings.

DETAILED DESCRIPTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The presently preferred embodiment of the invention is a tool that incorporates superabrasive materials in a pin and shoulder, and utilizes thermal management within the tool, to enable friction stir welding of materials that are presently functionally unweldable. Thus, the present invention makes possible long, continuous, and uninterrupted welds of MMCs, ferrous alloys, and superalloys without suffering significant degradation of the tool.

The development of the presently preferred embodiment presented significant challenges because conventional tools wore out or broke when used on MMCs, ferrous alloys, and superalloys. These challenges can be summarized as thermal wear, mechanical wear, chemical wear, thermal management and geometry of the tool. The solutions to these challenges posed significant problems until the materials selected for the tool were combined with the correct tool geometry and thermal management, as will be explained through illustration of various embodiments of the invention.

The sequence of events that culminated in the tool of the present invention that is capable of functionally welding MMCs, ferrous alloys, and superalloys began with a test on a broken tool. This broken tool had a pin broken off while running a weld on an workpiece material made from MMC. Therefore, only a raised shoulder formed of CBN was disposed thereon, with a locking collar. The inventors never expected the shoulder to withstand the chemical or mechanical wear on a ferrous material, but wondered what would happen. Surprisingly, the shoulder showed no significant signs of wear after a long and continuous run over a workpiece having a high melting point.

The success of the test led the inventors to experiment with various tool embodiments, trying to identify those characteristics of the tool that could take advantage of the surprising wear and thermal resistance results of the broken tool.

Figure 1:
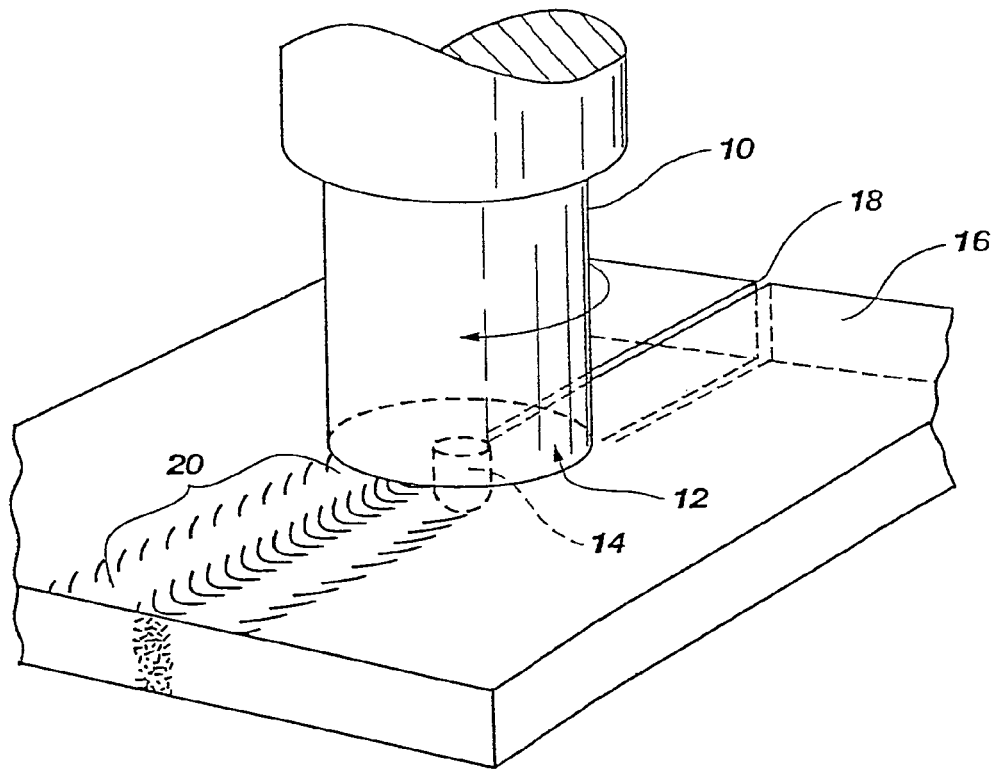
FIG. 1 is a perspective view of a state of the art friction stir welding tool that is welding two plates of material together.
Figure 2A:
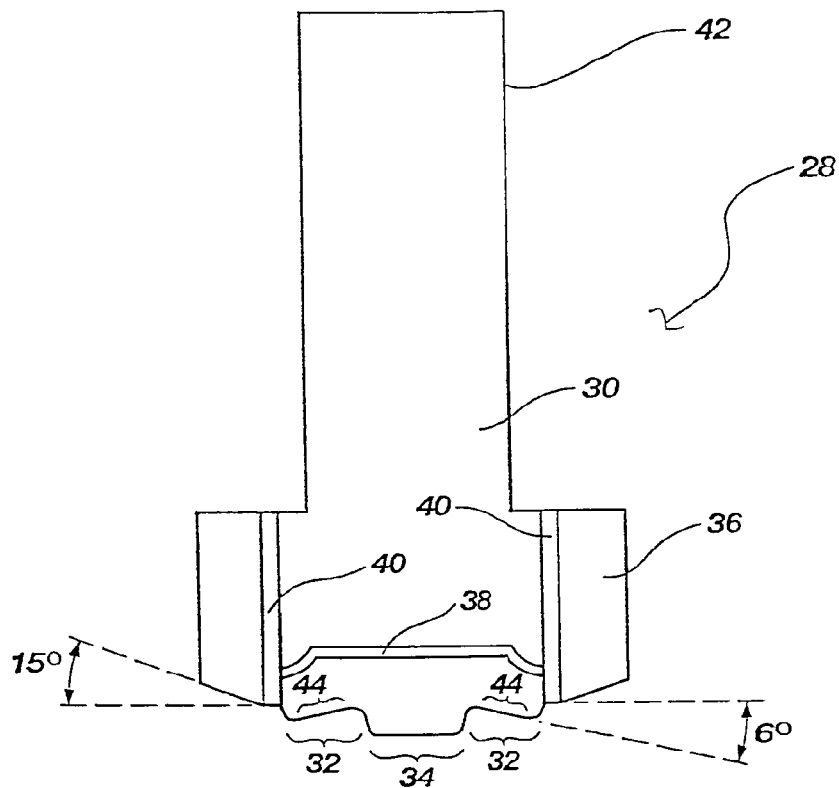
FIG. 2A is a cross-sectional profile view of the preferred embodiment, made in accordance with the principles of the present invention.

FIG. 2A is a cross-sectional profile view of the elements of the preferred embodiment of the present invention that is a result of those tests. Beginning with the mechanical elements, the tool 28 includes a shank 30 that is generally cylindrical. Coupled to the shank 30 is a shoulder 32 with an integral pin 34. Coupled around a portion of the shank 30 and the shoulder 32 with an integral pin 34 is a collar 36. Disposed between the shank 30 and the shoulder 32 with an integral pin 34 is a thermal flow barrier 38. There is also a thermal flow barrier 40 disposed between the collar 36 and a portion of the shank 30, as well as the shoulder 32 with an integral pin 34.

This preferred embodiment incorporates several novel elements, only some of which are readily apparent from FIG. 2A. First, the preferred materials used in construction of the tool 30 are critical to the invention. The shank 30 is preferably cemented tungsten carbide. Cemented tungsten carbide is selected for its strength, and for its high thermal conductivity that allows proper cooling of the shank to maintain its strength relative to the other materials used in the tool 28.

One advantageous characteristic of the superabrasive material is its high thermal conductivity. However, it is important to understand that the thermal conductivity can be useful or a detriment to the tool, depending upon how it is managed. Experimentation has demonstrated that thermal management is critical to creating a successful friction stir welding tool.

For example, when the pin 34 is coated with a superabrasive material, this resulted in significant amounts of heat being drawn away from the weld region. To compensate, the tool 28 had to be driven harder than desired to create more heat in the weld region. Therefore, a successful tool has to direct sufficient heat to the weld region to enable solid-phase welding, while at the same time limiting the heat so that the weld region is kept as cool as possible in order to obtain a high quality weld region. In other words, with high thermal conductivity of the superabrasive, the tool can be designed to regulate any desired flow of heat out of the tool, thereby enabling design flexibility. In contrast, a material with lower thermal conductivity would be limited to its own value of thermal conductivity, or less.

Where a lot of heat is generated by the tool because of required run parameters, it may be necessary to resort to external cooling of the tool. The objective is to have a tool whose thermal flow characteristics can be modified in order to obtain the best weld characteristics, including a weld that cools fast.

A thermal management scheme was developed in order to maintain the heat generated by friction between the tool and the workpiece near the weld region. One aspect of the scheme is to select a material for the shank 30 that will restrict heat flow from the pin 34, to a tool holder (not shown) that is gripping the attachment end 42 of the tool 28. The tool holder causes the tool 28 to rotate, and it might also be damaged by heat. The thermal management scheme also keeps the shank cool enough to resist translational forces during friction stir welding.

Alternatively, a high strength steel can be substituted for the cemented tungsten carbide in the shank 30, but the steel will conduct less thermal energy away from the shoulder 32 and integral pin 34, thereby causing the shank to run at a higher temperature and reduced strength. However, the steel will function with the proper cooling.

If rotating the pin 34 against the workpiece material is what enables heat to be generated for the friction stir welding process, it is important to know what rates of rotation will result in a functional weld. The rate of rotation of the shoulder 32 with an integral pin 34 is preferably within the range of 50 rpm to 2000 rpm, depending upon the material being welded, the diameter of the tool, and the composition of the elements of the tool 28. It is noted that the preferred surface speed of the tool is between 7 and 400 surface feet per minute.

Along with the rate of rotation, the timing of the friction stir welding process is not trivial either. It is important that the pin 34 be plunged into the workpiece material only when it is sufficiently heated to form a plasticized welding region. However, this timing changes for the materials being used, for each tool configuration, and for the process parameters used.

The purpose of the thermal flow barrier 38 can now be understood in light of the previous comments regarding thermal flow management. It is critical that the frictional heat be properly managed to keep heat focused on the workpiece material without drawing it away through the tool 28. In the presently preferred embodiment, titanium or a titanium alloy is selected as the material for the thermal flow barrier 38. A titanium alloy is selected because of its ability to withstand the temperatures that are experienced by the tool 28, and because of its relatively low thermal conductivity. Nevertheless, it should be realized that the titanium alloy is not the only material that can be used. It is described for illustration purposes, and can be replaced with a material that performs a similar function.

The shoulder 32 with integral pin 34 is a most novel element of the invention because of the materials used in its fabrication, and because of its geometry. These elements are selected in order to overcome the extreme thermal, mechanical, and chemical wear of the friction stir welding process. One type of wear is not necessarily more important than another, they just result in different types of failures.

Regarding material, it has been determined through experimentation that using a superabrasive on the shoulder 32 and the pin 34 has enabled the invention to achieve functional welding of MMCs, ferrous alloys, non-ferrous alloys, and superalloys. Specifically in the preferred embodiment, polycrystalline cubic boron nitride (PCBN) is used as a superabrasive-coating on a substrate material being used for the shoulder 32 with the integral pin 34.

To state that a coating of PCBN is utilized as a superabrasive coating on the substrate material might imply that the application process is trivial. This is far from the case. The coating is not merely a substance that is wiped on using a room temperature process. Rather, the application involves high temperatures and ultra high pressures. Furthermore, the geometry of the surface to which the superabrasive is applied has much to do with the ability of the superabrasive to wear well, and to avoid failure from cracking. Accordingly, an important aspect of the invention is to describe a tool geometry that will obtain the best results from a superabrasive coating. Another important aspect of the invention is to describe the possible superabrasive materials that can be used. One example of how the coating is applied will now be provided.

PCBN is made from hexagonal boron nitride power in an ultra high temperature and ultra high pressure (UHTP) press (one million psi at 1400 degrees Celsius, or 1673 K). Time and temperature are adjustable to create cubic boron nitride crystals having the optimum size, shape and friability for specific applications. The crystals range in size of diameter from under a micron to around 50 microns.

For fabricating the shoulder 32 and integral pin 34 of the present invention, the cubic boron nitride (CBN) crystals are mixed with a powder of a different or second phase material. The second phase material is either ceramic or metal based. The CBN provides mechanical strength, while a ceramic would provide resistance to chemical wear. Therefore, the percentage of CBN relative to the second phase material is dependent upon the application, where a balance must be struck between mechanical and chemical wear resistance.

It has been determined that the second phase material generally adds a toughness and chemical stability to the PCBN. The toughness is in part due to the ability of the second phase to inhibit crack propagation. The CBN helps here as well, as it has randomly oriented fracture plans that naturally resist spalling. Lower CBN content is generally used for machining operations of hardened high temperature superalloys needing more chemical wear resistance and less mechanical wear resistance. Higher CBN content is used for abrasive wear resistance, where the second phase is generally metallic for added toughness.

It is important to note that CBN crystals have hardness values, thermal conductivity, thermal expansion, coefficient of friction values, fracture toughness, and transverse rupture values similar to diamond. These properties are engineered using the second phase material to achieve a specific application requirement.

The mixed powder is placed with a substrate such as cemented tungsten carbide, or even a free-standing PCBN blank, in a refractory metal container. The container is sealed and returned to the UHTP press, where the powder is sintered together and to the substrate to form a PCBN tool blank. The PCBN tool blank is then either ground, lapped, wire EDM cut, or laser cut to shape and size, depending upon the application.

Superabrasives are materials that are defined as being processed under high temperature and ultra high pressure. Superabrasive materials include PCBN and polycrystalline diamond (PCD). These materials are going to be found on the periodic table and identified as compounds including elements extending from IIIA, IVA, VA, VIA, IIIB, IVB, and VB.

Superabrasives have a hard primary or first phase, and a secondary catalytic phase that facilitates primary phase crystal structure sintering and transformation. Superabrasives may or may not be electrically conductive. They can also be strengthened using whisker reinforcement. They may also be considered as materials that undergo a solid-state phase transformation during processing at elevated temperature and pressure, and a material that is created by a sintering process, with or without a binder.

Another aspect of the invention concerns the shoulder 32. Depending upon how it is manufactured, the superabrasive material on the shoulder 32 may be relatively thin. This becomes important if the superabrasive material is being finished to a desired form. If the finished form includes a slanted, beveled or angled surface or other similar structure as shown in this embodiment, it is important that the slant not pierce the superabrasive material. Accordingly, the thickness of the superabrasive must be sufficient to provide the desired slant without reaching the substrate material.

As the present invention was being developed, a tool designed for friction stir welding of aluminum was used on a ferrous alloy. The tool failed at the pin. This is because there are geometrical considerations that must be taken into account when friction stir welding harder materials with higher melting points, and when using a shoulder and pin that are coated with a superabrasive material. Thus, other novel features of the invention include 1) the elimination of stress risers, 2) the use of larger radii or chamfers, 3) more uniform distribution of stresses, and 4) increasing the diameter of the pin.

Regarding stress risers, many prior art patents teach exotic pin designs, including threaded pins, and pins having sharp edges and angles. Screw threads on a pin are generally desirable because the threads push the workpiece material back down into the workpiece causing a stirring action and a better weld. However, these shapes are generally undesirable in the present invention because they function as crack initiators for a superabrasive coating, but can be used in a modified form to minimize the stress riser. Therefore, large radii or chamfers on the shoulder 32 and the pin 34 are desirable. These large radii are shown in FIG. 2A.

Regarding pin diameter, the pin 34 of the preferred embodiment is larger in diameter than conventional tools.

This is partly due to the greater stresses that the pin 34 will experience when friction stir welding MMCs, ferrous alloys, and superalloys. The pin diameter is probably best expressed as a ratio of pin diameter compared to pin length. In the presently preferred embodiment, the range of ratios extends from 0.2:1 to 30:1.

It is also noted that the shoulder 32 is not shown as a flat surface relative to a workpiece. The shoulder 32 is in fact concave. This shape enables the plasticized workpiece material to be more easily displaced and flow around the pin 34. The concave shape also forces the plasticized workpiece material back into the workpiece.

Although a relatively flat region 44 is shown between the outer and inner radii of the shoulder 32, this region 44 can also be curved to form a concave or a convex surface. Alternatively, the shoulder 32 can be also be convex or flat relative to the workpiece.

The friction stir welding process requires that the tool holder press down on the tool 28. This axial pressure is generally sufficient to hold the components 30, 32, 34 together in the axial direction. However, as the tool 28 is translationally moved with respect to the workpiece, significant rotational forces are urging the shank 30 to move relative to the shoulder 32. It is critical that the elements not turn-relative to each other. Relative rotational movement would prevent the pin from generating sufficient frictional heat against the weld region of the workpiece.

Therefore, it is a novel element of the invention to require that the elements be mechanically locked. Mechanical locking is necessary because brazing the components together will only serve to function as a point of weakness of the tool 28. This is because the brazing material is likely to have a melting point that is at most near the temperature at which friction stir welding is being performed.

Figure 2B:
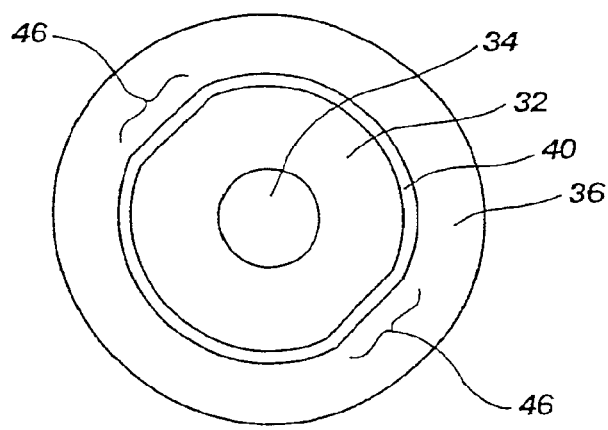
FIG. 2B is an end view of the tool shown in FIG. 2A.

Mechanical locking was first accomplished via dovetailing in early experiments. However, the dovetails propagated crack formation in portions of the tool 28. Therefore, it is preferred to use flats 46 as shown in FIG. 2B. The flats 46 prevent slipping of the tool 28 components 30, 32, 34 relative to each other, combination with a locking collar. Although the figure shows two flats, 1 to any desired number can be disposed around the circumference of the tool 28.

Alternatively, the flats 46 can be replaced by other surface features that enable the tool components 30, 32, 34 to be mechanically locked into a position where they will remain stationary relative to each other. The other surface features include the use of splines, friction welding, diffusion welding, lock on back, or a lock on the outside diameter of the shank.

The final components of this preferred embodiment are the collar 36 and the thermal flow barrier 40. One of first collar materials that was used in experimentation was formed of a titanium alloy. Disadvantageously, titanium alloy is drawable, and will creep and flow under high temperatures. Initial tests with a titanium collar showed that the titanium alloy collar actually fell down around the shoulder and pin and onto the workpiece as the tool made a welding run.

Accordingly, it was decided that another material would be fastened around the shoulder 32 and the shank 30 to mechanically lock them together. In addition, the titanium alloy would still be present in order to insulate the new collar material from the high temperatures of the shoulder 32 and pin 34. This insulation also assisted in thermal management to thereby maintain the desired temperature at the welding region of the workpiece. The presently preferred embodiment utilizes a superalloy for the material of the collar 36. For example, nickel-cobalt, or cobalt-chromium are suitable superalloy materials.

FIG. 2B is provided as an end-view of the tool 28. The materials that are visible from this perspective are the pin 34, the shoulder 32, the titanium alloy thermal flow barrier 40, and the collar 36.

Although the preferred embodiment teaches the use of CBN as the superabrasive coating on the shoulder 32 and the pin 34, this is not the only superabrasive material that can be used. For example, one of the best substitutes for CBN is polycrystalline diamond. It is well known that PCD exhibits many of the performance characteristics of CBN.

Dimensions of the preferred embodiment are only useful as an example, but will be provided. The diameter of the pin is 0.37". The diameter of the shoulder is 1". The thickness of the titanium alloy thermal barriers 38, 40 are 0.060", and the diameter of the collar 36 is 1.63". The angle on the collar 36 is shown as 15 degrees, and the angle of the shoulder is shown as 6 degrees. These figures are for illustration purposes only, and should not be considered limiting. Nor will these dimensions work for all applications.

There are various issues that need to be explained in order to understand all of the advantages and requirements of the present invention, and how the preferred embodiment was developed.

One important consideration of the tool 28 is that while CBN is a good material for friction stir welding steel, it may not be good for other materials. Therefore, it is an element of the invention to make it possible to mix and match shoulders and pins, as will be shown in alternative embodiments.

Another consideration is that some superabrasives are soluble in certain materials. For example, PCD has a chemical reaction with a titanium alloy at friction stir welding temperatures. Thus, diamond cannot be used to weld materials that are carbide formers, unless the highest temperature that will be reaches is below a soluble point.

There are two distinct advantages to using superabrasives in the shoulder 32 and the pin 34 of the present invention. First of all, the coefficient of friction of CBN and of diamond is very low (0.05 to 0.1). In contrast, the coefficient of friction of steel is 0.8. This low coefficient of friction enables the workpiece material to slide along the tool 28 instead of sticking to it. The result is a much cleaner finish that does not require a lot of finishing work. Finishing costs can be high, especially with ferrous alloys and superalloys. The low coefficient of friction also leads to reduced tool wear.

Second, the thermal conductivity of CBN and PCD are high, about 100 to 550 Watts/meter-K, compared to steel which is about 48 Watts/meter-K. The result is that the weld is cooler. Cooler welds are desirable because they form further away from the melting point, and thus avoid all of the problems of liquid welding phases. It has been demonstrated in tests that one of the direct benefits of the present invention is that the welds have greater tensile strength compared to welds using more conventional arc welding. Of course, the high thermal conductivity of CBN is also the reason for the user of thermal flow barriers 38, 40 that are used to keep the heat from escaping the weld region of the workpiece.

It has been explained that a substrate for the shoulder and the pin has been coated with a superabrasive. It is another novel element of the invention to allow for multiple coatings. These coatings can be applied using CVD, ion-implantation, or PVD processes. The purpose of the coatings is to provide features that will assist the superabrasive to withstand the different types of wear that it experiences. For example, a second coating can enhance the chemical wear resistance.

The coatings that are applied to substrates or on top of the superabrasives can be of varying thicknesses. Although in the abrasive tool industry a coating of 0.030" to 0.050" is considered a thick coating, and a coating of less than 0.001 is considered a thin coating, it is an aspect of the invention that other thicknesses may be required for optimum performance of the coating material. Solid CBN can also be pressed so that it has no coating. This CBN can be pressed to as large a volume as the UHTP process will allow, usually up to 4 inches in diameter by 4 inches long. This solid CBN does not, however, have the benefit of a substrate that adds strength and toughness.

While thermal management is a novel element of the preferred embodiment, cooling of the tool is also important, but for a different reason. Thermal management is used to ensure that enough heat is directed to the weld region by making sure it is not siphoned away. But for the heat that is able to move away from the shoulder and pin, it is often necessary to provide some type of active cooling. Cooling can take the form of a mist directed at the exterior of the tool, or even air. But cooling can also be an internal process. Thus, it may be necessary with some materials to provide internal cooling by providing a cooling channel through a portion of the shank. It is also possible to cool the tool holder. Cooling can even extend to the workpiece itself. While heat is necessary for the weld, it should always be remembered that a cool weld is inherently stronger, and that friction stir welding is a solid-state process.

There are several alternative embodiments that must also be considered in order to understand performance issues. The presently preferred embodiment teaches a tool having two components, the shank 30, and the shoulder 32 with an integral pin 34. However, experimentation has shown that the pin 34 will usually wear out before the shoulder 32. If they are integral, the entire shoulder 32 and pin 34 combination have to be replaced together. This is a waste of resources.

Figure 3:
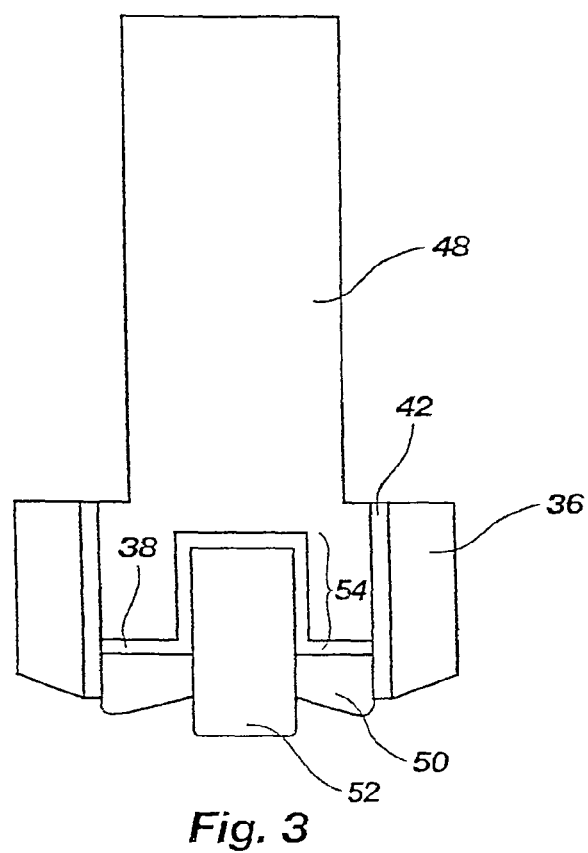
FIG. 3 is a cross-sectional view of an alternative embodiment, where the shank, shoulder and pin are all separate components.

Therefore, FIG. 3 is a cross-sectional perspective view of an alternative embodiment wherein the shoulder 50 is not integral with the pin 52. Instead, these components are manufactured separately, and coupled to the shank 48. As shown in FIG. 3, the pin 52 rests within a bore hole 54 drilled into an end of the shank 48. The thermal flow barriers 38, 40 are still in place, except for where the pin 52 extends into the shank 48. However, if the pin 52 only has a superabrasive coating on the portion that is outside of the bore hole 54, then the cemented tungsten carbide (or other suitable) substrate of the pin 52 is not going to be as good a thermal conductor to the shank 48. Nevertheless, in an alternative embodiment, the thermal barrier can be extended down into the bore hole 54.

Coupling the pin 52 to the shank 48 is also not a trivial matter. Preferably, the pin 52 is disposed into the bore hole 54 using a press fitting. However, it is likely that a hex or square shaped hole may be desirable. It is noted that it is possible to add strength to the pin 52 if it is put into residual compressive stress.

Residual compressive strength can be created, for example, by heating the tool. As the tool is heated, it expands. The diameter of the pin is selected so that when the tool cools, it exerts positive mechanical pressure on the pin.

Another method of attachment might be to dispose a screw into the pin 52. The screw would be used to pull the pin into compression through the back end of a tool.

Figure 4:
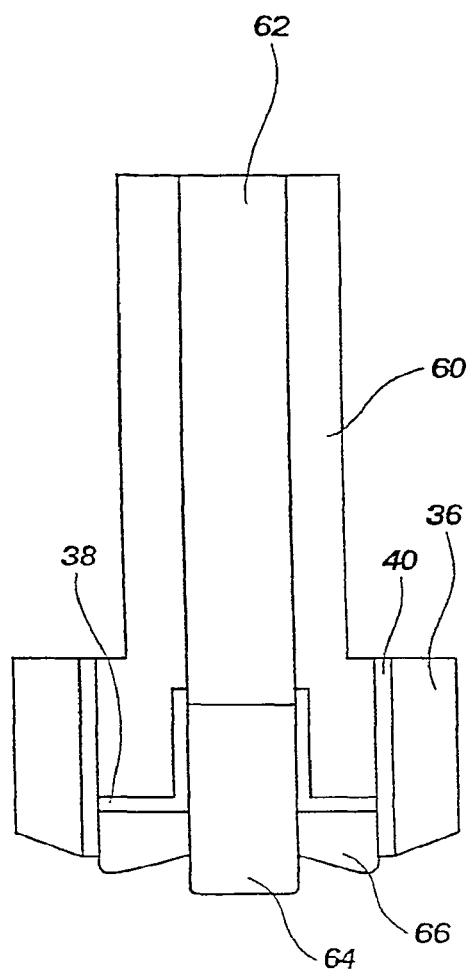
FIG. 4 is a cross-sectional view of another alternative tool embodiment, where a hole is disposed through the length of the shank to assist in pin replacement.

FIG. 4 is provided as another alternative embodiment of the present invention. The difference from FIG. 3 is that the hole 62 now extends entirely through the shank 60. One of the main advantages of this embodiment is that replacing the pin 64 is simply a matter of pushing the pin 64 out of the shank 60 by inserting a tool through the hole 62. This design can reduce costs, and make the tool reusable for many applications. It is thus only necessary to insert a pin 64 of the proper length.

One aspect of the invention that has not been addressed is the composition of the pin when it is a replaceable item. Preferably, the pin is manufactured from cemented tungsten carbide, and coated with an appropriate superabrasive. However, the pin can also be manufactured as a solid superabrasive material, or be a carbide with the desired coating.

Another aspect of the pin is that it can be reinforced. Reinforcing a pin may be desirable if the pin length is unusually long because of the thickness of the workpiece material. Reinforcement may also be necessary when the material of the pin does not inherently have the strength of a material such as tungsten carbide.

In a similar manner, the shank can also be manufactured from a superabrasive, or be a carbide that is coated with a superabrasive.

Figure 5:
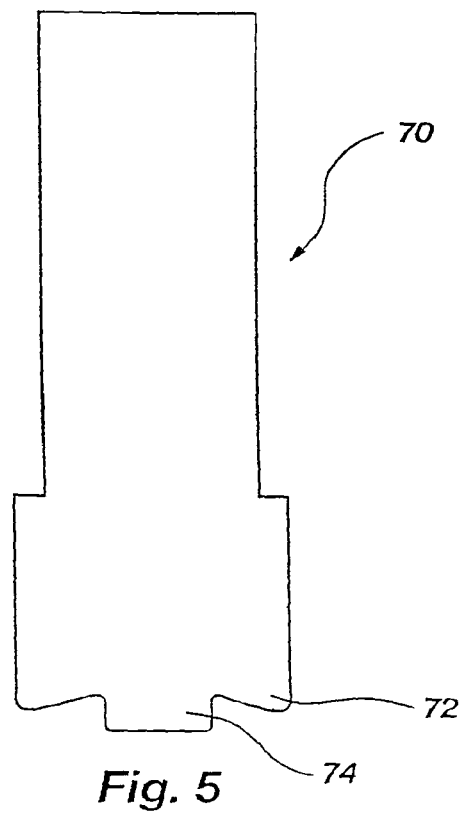
FIG. 5 is a cross-sectional view of another alternative tool embodiment, where the shank, shoulder and pin are a monolithic element.

FIG. 5 is another alternative embodiment of the invention, wherein instead of having separate components, the tool 70 is a monolithic unit. However, the cost of manufacturing an entire tool as a single piece is prohibitively expensive. Given the advantages of the other embodiments, it is unlikely that this embodiment will be widely used. Nevertheless, it is an option that would likely be formed from cemented tungsten carbide, with a superabrasive coating applied to the shoulder 72 and pin 74 areas. The difficulty in its use might be the thermal management that is seen as critical when using superabrasives. Therefore, insertion of a thermal barrier may be important, but that would defeat the purpose of the monolithic design.

Figure 6A:
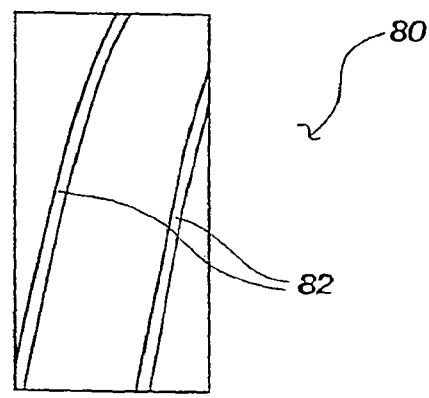
FIG. 6A is a cross-sectional view of an endmill blank that is functioning as a pin, the pin having helical channels in which is disposed superabrasive material.
Figure 6B:
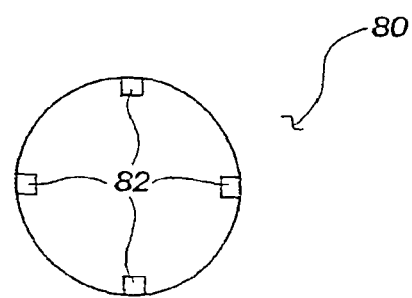
FIG. 6B is an end view of the endmill blank of FIG. 6A.

An alternative embodiment of the invention is the type of pin that is inserted into the tool. FIG. 6A is provided as a profile perspective view of a helical endmill blank 80. The substrate of the blank 80 is preferably cemented tungsten carbide, with the PCBN or other superabrasive disposed in helical channels 82. FIG. 6B is an end view of the blank 80, illustrating the helical channels 82 in which the superabrasive material is disposed.

Figure 7A:
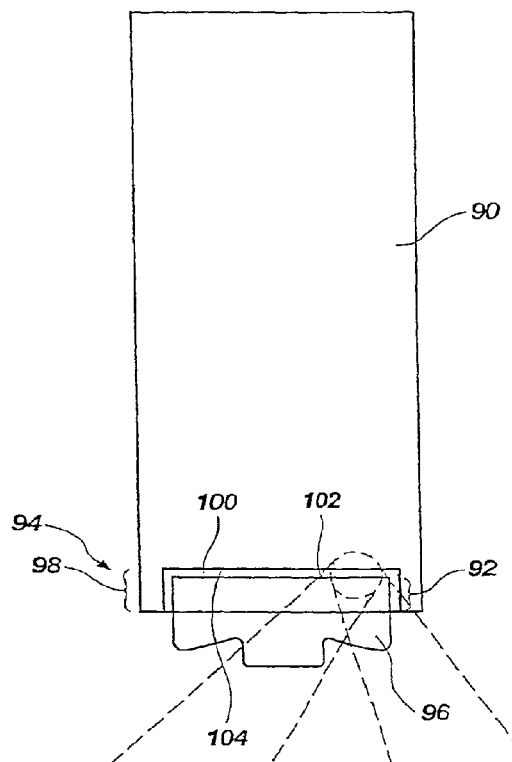
FIG. 7A is a cross-sectional view of another alternative tool embodiment, where the shank also functions as a locking collar.

It is envisioned that there will be other means for coupling a PCBN shoulder or coated shoulder to a shank. FIG. 7A is provided as a cross-sectional illustration of another tool embodiment that provides all of the desirable characteristics of the present invention, but without the use of a separate locking collar. In this figure, the locking collar is replaced by a portion of the shank itself so that it is integral to the shank itself.

Specifically, the shank 90 is shown having a bore hole 92 disposed partially into the working end 94 of the shank. The depth of the bore hole 92 is selected based upon the depth of the shoulder and the pin 96. In this embodiment, the shoulder and the pin 96 are integral. However, the shoulder and the pin 96 could also be separate components as shown in previous embodiments. What is important about this embodiment is that the wall 98 around the bore hole 92 functions as a locking collar, to thereby assist in preventing rotational movement of the shoulder and the pin 96 relative to the shank 90. This can be accomplished, for example, by press fitting the shoulder and the pin 96 into the bore hole 92. Notice that the thermal flow barrier 100 is also in place to enable management of heat from the shoulder and the pin 96 to the shank 90.

However, it is possible that under some load conditions, the shoulder and the pin 96 may slip despite the press fitting. Therefore, it is also envisioned that this embodiment includes the use of some other means for mechanically locking the back surface 102 of the shoulder and the pin 96 to the shank 90. This can be accomplished using some of the previously mentioned techniques. For example, mechanical locking can be performed by complementary dentations, splines or other physical features on the back surface 102 and the bottom surface 104 of the bore hole 92 that prevent relative rotational movement through complementary interlocking.

Figure 7C:
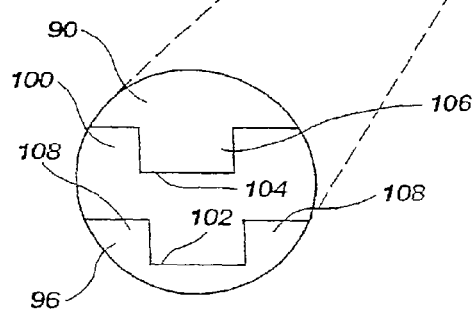
FIG. 7C is a close-up profile view of surface irregularities that enables mechanical locking to thereby prevent slipping of the shoulder relative to the shank.
Figure 7B:
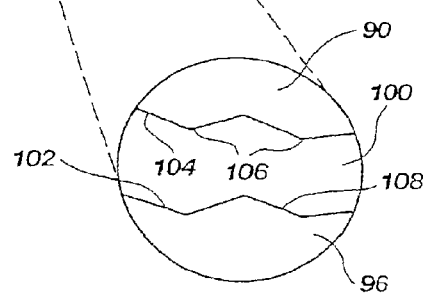
FIG. 7B is a close-up profile view of surface irregularities that enables mechanical locking to thereby prevent slipping of the shoulder relative to the shank.

FIGS. 7B and 7C are provided as an illustration of just two examples of how the back surface 102 of the shoulder and the pin 96 can be mechanically locked to the bottom surface 104 of the bore hole 92 of the shank 90. In this figure, bore hole splines 106 are formed in the bottom surface 104 of the bore hole 92, and complementary splines 108 are formed on the back surface 102 of the shoulder and the pin 96.

An important and novel aspect of the invention also pertains to the flow of the workpiece material around the tool pin. Although friction stir welding is said to occur as a solid-phase process, the workpiece material is still capable of fluid-like movement, or flow. It is important when trying to obtain the best weld possible to increase the rate of flow of the workpiece material around the pin.

Laminar flow is defined as non-turbulent fluid flow. Unfortunately, laminar flow of the workpiece material is also the slowest. Therefore, any geometry of the pin that will result in the increased rate of fluid flow of the workpiece material around the pin will also result in a weld having the improved weld characteristics. Accordingly, it is desired to have a turbulent fluid flow of the workpiece material, or transitional flow which is defined as a flow that has turbulent characteristics. Therefore, it is desirable to trip a boundary layer from laminar flow into the transitional or turbulent type of flow. Furthermore, it is also desirable to obtain the transitional or turbulent flow at the lowest possible rotational speeds of the tool, and with the simplest tool geometry.

Figure 8:
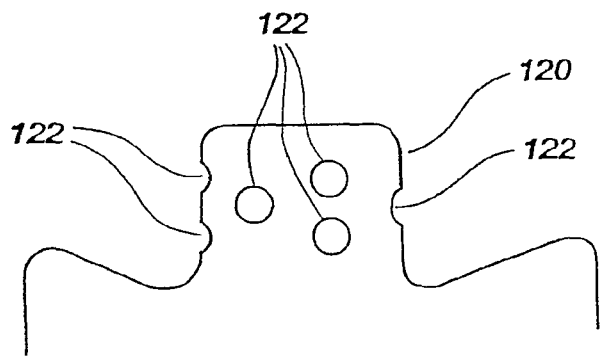
FIG. 8 is a cross-sectional profile view of a pin having surface deformations designed to create transitional or turbulent flow around the pin in the workpiece material.

It is therefore an aspect of the invention to teach a pin geometry that will result in transitional or turbulent flow of the workpiece material. FIG. 8 is provided as a profile view of a pin having physical deformations that are designed to obtain at least some transitional or turbulent flow of the workpiece material around the pin. As shown, the pin 120 is covered by a plurality of dimples 122, much like the dimples of a golf ball. The number, size, and depth of the dimples 122 will need to be varied in order to obtain the desired flow characteristics for the workpiece material.

Figure 9A:
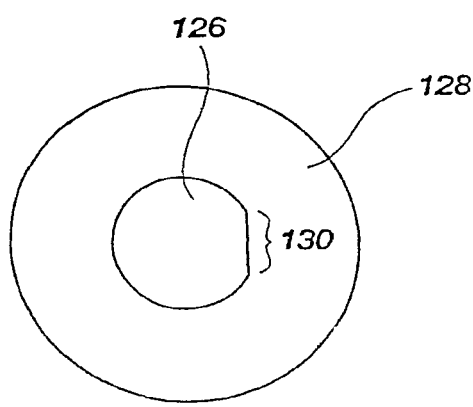
FIG. 9A is an end view of a pin that includes surface deformations in the form of a flat on the pin designed to create transitional or turbulent flow around the pin.
Figure 9B:
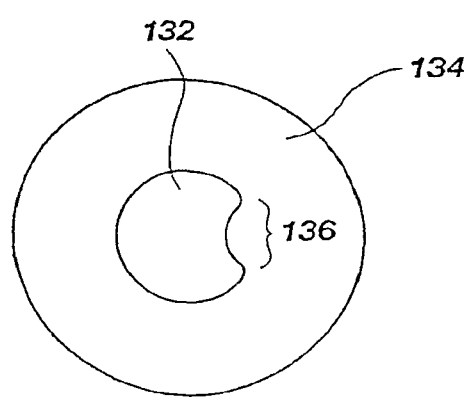
FIG. 9B is an end view of a pin that includes surface deformations in the form of an irregular surface on the pin designed to create transitional or turbulent flow around the pin.

Similarly, FIG. 9A is provided as an end view of a pin 126 and shoulder 128 that is designed to generate transitional or turbulent flow around the pin. The pin 126 is shown having a single flat 130 on a side thereof. It is envisioned that the total number and the width of the flats 130 can be adjusted to obtain the desired flow characteristics of the workpiece. It is also envisioned that instead of a flat surface, the surface irregularity will extend the length of the pin, and may not be a uniform surface. For example, FIG. 9B shows another end view of a pin 132 and shoulder 134, where a surface irregularity 136 is not flat.

Figure 10:
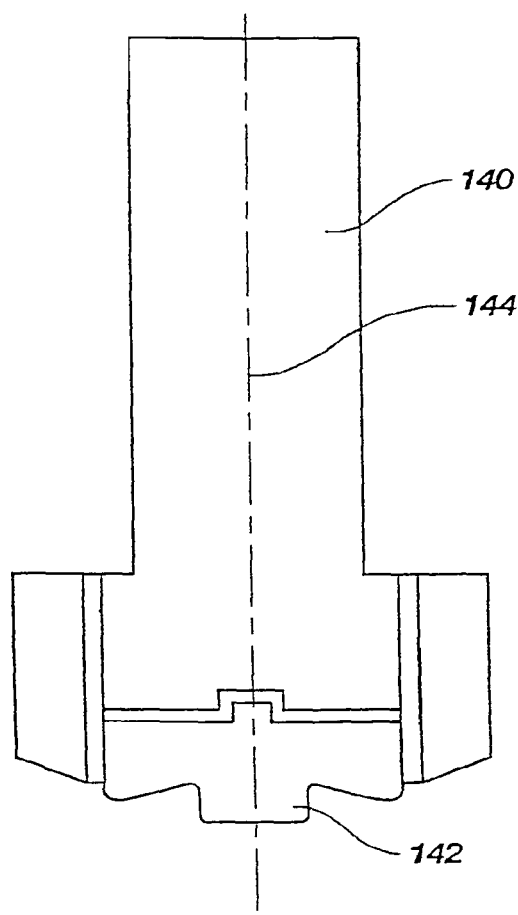
FIG. 10 is cross-sectional profile view of a tool that has an off center pin or cam designed to create transitional or turbulent flow around the pin.

Another aspect of the invention also related to obtaining transitional or turbulent flow around the pin is shown in FIG. 10. FIG. 10 is a profile view of a tool 140, where the pin 142 is disposed parallel to but no longer concentric with a lengthwise axis 144 of the tool. The pin 142 is now offset, thereby creating a cam configuration that is designed to generate transitional and turbulent flow in the workpiece material. It is noted that the degree of offset is exaggerated for illustration purposes only. The actual offset will depend upon the tool and the workpiece characteristics.

It is also envisioned that many useful pin geometries and tools can be adapted in accordance with the principles of the present invention. For example, tools having pins of adjustable length can provide many benefits. The tools must be modified to reduce stress risers, either coated on the shoulder and pin with superabrasive materials or manufactured from solid superabrasive materials, and utilize thermal management techniques as taught in the present invention.

A last aspect of the invention is the subject of pressing a tool to a near net shape. Near net refers to a tool that after pressing requires very little finishing to obtain the final product. In the presently preferred embodiment, the pin, shoulder, integral pin and shoulder, and pin with reinforcement are pressed to near net shape.

It is to be understood that the above-described arrangements are only illustrative of the application of the principles of the present invention. Numerous modifications and alternative arrangements may be devised by those-skilled in the art without departing from the spirit and scope of the present invention. The appended claims are intended to cover such modifications and arrangements.

What is claimed is:

1. A method for applying a compression force on a pin of a friction stir welding tool as the tool is heated during use, said method comprising:
    providing a cylindrical shank, a shoulder functioning as an inner collar and disposed on a working end of the shank, a bore hole disposed through the shoulder and partially into the shank, a cylindrical friction stir welding pin comprising a superabrasive held stationary within the bore hole, and a locking collar engaged around the inner collar; and
    friction stir welding a working surface to frictionally heat the inner collar, thereby causing lateral thermal expansion of the inner collar; and
    heating the cylindrical friction stir welding pin by the friction stir welding causing lateral thermal expansion; and
    preventing outward lateral expansion of the inner collar by the presence of the locking collar around the inner collar, thereby causing the inner collar to compress inward against the friction stir welding pin and the friction stir welding pin to expand outward against the inner collar.

2. The method as defined in claim 1 wherein the method further comprises disposing a thermal barrier between the shoulder and the locking collar to thereby concentrate heat within the shoulder and the friction stir welding pin.

3. A method for applying a compression force on a pin of a friction stir welding tool as the tool is heated during use, the method comprising:
    positioning a friction stir welding tool adjacent a workpiece material, the friction stir welding tool comprising:
        a shank having a first end and a second end,
        a shoulder and pin including a superabrasive material, the shoulder and pin disposed proximate the first end of the shank, and
        a thermal flow barrier, the thermal flow barrier being at least partially disposed between the shank and the shoulder and configured to impede conduction of thermal energy therebetween;
    moving the friction stir welding tool relative to a working surface of the workpiece material to generate thermal energy and plastically deform the workpiece material;
    heating the inner collar, shoulder, and pin with the thermal energy, causing lateral expansion of the inner collar, shoulder, and pin;
    preventing outward lateral expansion of the inner collar by the presence of a locking collar around the inner collar; and
    focusing the thermal energy on the workpiece material.

4. The method of claim 3, wherein focusing the thermal energy comprises regulating the conduction of the thermal energy away from the workpiece material through the tool.

5. The method of claim 3, wherein the locking collar is disposed circumferentially about the first end of the shank and the friction stifling surface; and
   a second thermal flow barrier, the second thermal flow barrier being at least partially disposed between the locking collar and the shoulder and configured to impede conduction of the thermal energy therebetween.

6. The method of claim 5, further comprising regulating the conduction of the thermal energy such that the thermal energy is further concentrated at the friction stifling surface by impeding the conduction of the thermal energy from the shoulder to the locking collar.

7. The method of claim 3, further comprising cooling the shank, and
   wherein the friction stir welding tool further comprises a cooling channel disposed longitudinally along at least part of a length of the shank and configured to cool the shank.

8. The method of claim 3, further comprising heating the working surface to form a plasticized welding region.

9. The method of claim 3, further comprising tripping laminar flow adjacent the friction stifling surface.

10. The method of claim 3, wherein the pin is an integral pin in the shoulder.

11. The method of claim 3, wherein the pin is a removable cylindrical pin associated with the shoulder.

12. A method of thermal expansion management during friction stir welding, the method comprising:
    providing a friction stir welding tool having a shank, a pin, and a shoulder, the pin and shoulder being disposed proximate a working end of the shank;
    positioning the friction stir welding tool adjacent a working surface;
    generating thermal energy in the pin and shoulder;
    directing the thermal energy on an interface between the pin and shoulder and the working surface using thermal management in the friction stir welding tool;
    heating the pin and shoulder with the thermal energy to cause lateral expansion of the pin and shoulder;
    preventing expansion of the pin and shoulder by the presence of a locking collar positioned circumferentially around the working end of the shank;
    heating the working surface with the thermal energy to form a plasticized welding region; and
    moving the friction stir welding tool relative to the working surface to plastically deform the working surface.

13. The method of claim 12, wherein the thermal energy is frictional energy between the friction stir welding tool and the working surface.

14. The method of claim 12, wherein directing the thermal energy on the working surface comprises inhibiting conduction of the thermal energy away from the working surface through the tool.

15. The method of claim 12, wherein the thermal management comprises a region of the tool having a lower thermal conductivity than a thermal conductivity of the shoulder.

16. The method of claim 12, wherein the friction stir welding tool further comprises a superabrasive.

17. The method of claim 12, further comprising cooling at least part of the friction stir welding tool.

18. The method of claim 12, further comprising advancing the friction stir welding tool to create an elongated weld in the working surface.

19. The method of claim 12, further comprising conducting thermal energy from the working surface.

\* \* \* \* \*